UNITED STATES PATENT OFFICE.

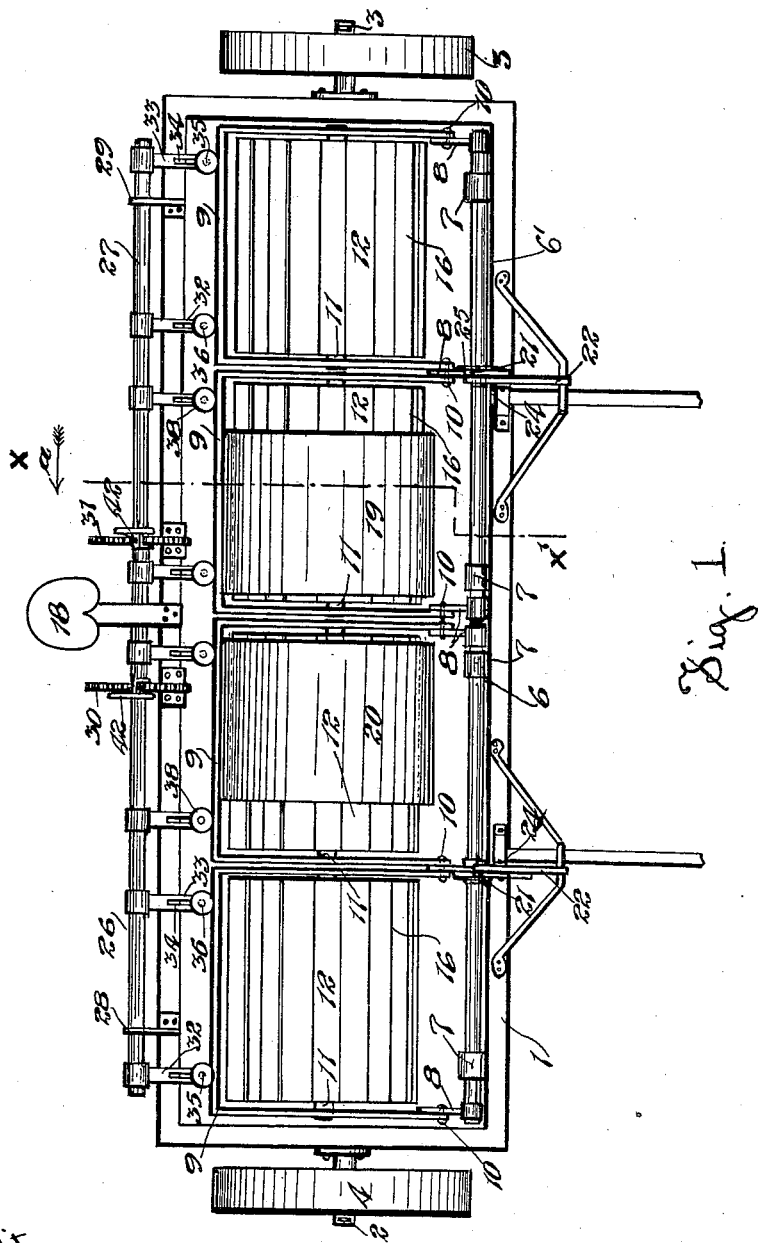

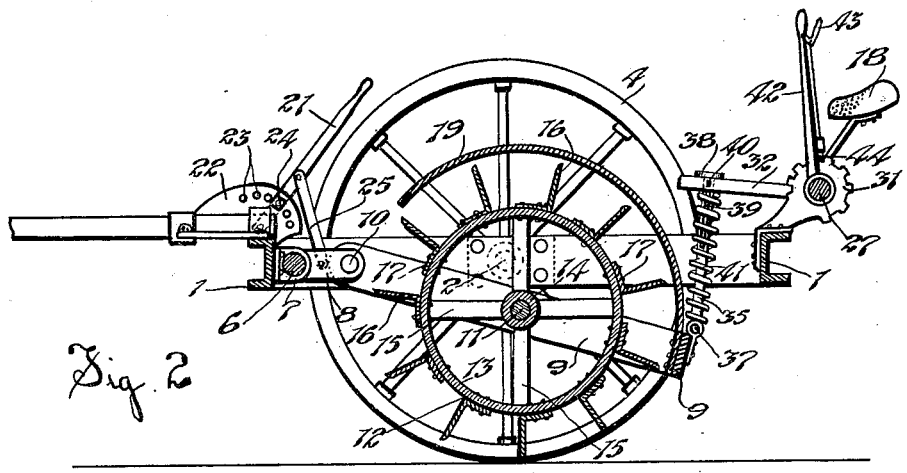
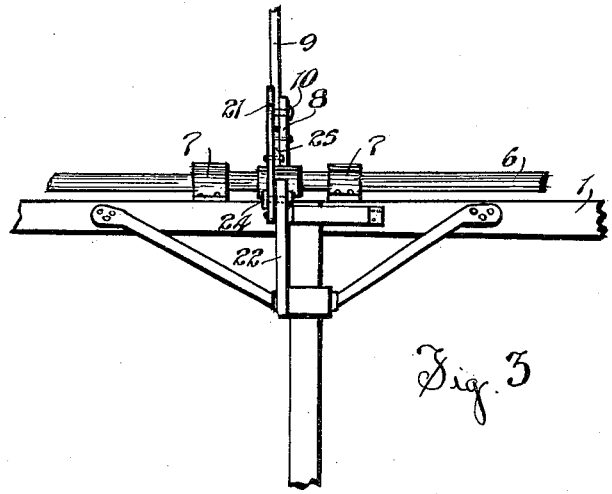

ALEXANDER McLEOD, OF WINNIPEG, MANITOBA, CANADA.

CULTIVATOR.

1,087,389.

Specification of Letters Patent.   Patented Feb. 17, 1914.

Application filed April 8, 1912.   Serial No. 689,334.

*To all whom it may concern:*

Be it known that I, ALEXANDER McLEOD, of the city of Winnipeg, in the Province of Manitoba, Canada, have invented certain new and useful Improvements in Cultivators, of which the following is the specification.

The invention relates to a cultivator and the object of the invention is to provide a machine which will effectively cultivate the soil and it consists essentially in a wheeled main frame, adjustable drums carrying cultivating blades, and means for applying pressure on the drums, the parts being arranged and constructed as hereinafter more particularly described.

Figure 1 is a plan view of the complete machine. Fig. 2 is a sectional view through the same, the section being taken in the plane denoted by the line X—X' Fig. 1 and looking in the direction indicated by the arrow "*a*." Fig. 3 is an enlarged detailed plan view showing the connection of the drums with the frame at the front.

In the drawings like characters of reference indicate corresponding parts in each figure.

1 represents a substantially rectangular main frame carried by stub axles 2 and 3 received within carriage wheels 4 and 5.

6 and 6' are front shafts rotatably mounted in bearings 7 secured to the front of the frame and 8 are arms permanently secured to the shaft at suitable intervals and extending normally rearwardly therefrom.

9 are open sided rectangular drum frames pivotally secured at 10 to the arms 8 and independently swingable within the main frame. The drum frames carry permanent shafts 11 on which I have mounted rotatable drums 12, each drum comprising a cylindrical shell 13, a hub 14, spokes 15 and cultivating blades 16. The hubs receive in each instance the shafts 11 and the blades are suitably spaced and firmly bolted to the drum at 17.

A driver's seat 18 is mounted centrally on the back of the frame and shields 19 and 20 close over the tops of the inner pair of drums adjoining the seat to prevent any possibility of an accident to the driver. These shields are secured to the frames 9.

21 are levers pivotally secured to plates 22 fastened to the main frame forwardly, which plates are supplied with openings 23 adapted to receive bolts 24 passing through the levers. The levers are connected to the adjoining arms 8 by links 25. Accordingly the arms can be raised or lowered by releasing the bolts and turning the levers as desired. Upon the bolts being inserted in the adjusted positions of the levers the arms are held firmly in position. This adjusting of the arms causes the drums to be lowered in respect to the frame so that the blades cut more deeply into the ground.

26 and 27 are two back rods passing longitudinally of the machine and supported rotatably at their outer ends in brackets 28 and 29 and at their inner ends in quadrants 30 and 31, the brackets and quadrants being permanently secured rearwardly to the frame. These shafts carry a pair of inwardly extending arms 32 and 33 for each drum frame, which arms are slotted at 34 and are permanently fastened to the rods 26 and 27.

35 and 36 are pairs of bolts pivotally secured at 37 to the rear of the drum frames and having their upper ends supplied with enlarged heads 38 and the body portions thereof fitted with slots 39 which receive in each instance a cross pin 40 carried by each of the arms 32 and 34, it being understood that the bolts pass into and through the slots 34. Spiral springs 41 are carried by the bolts and bear on and press continuously against the under faces of the arms.

Levers 42 are secured permanently to each of the rods 26 and 27, which levers are fitted with hand latches 43 and detents 44, the detents operating over the quadrants 30 and 31, respectively. The driver can put a greater downward pressure on the backs of the drum frames by throwing the levers 42 forwardly thereby causing the arms to press downwardly on the springs and the drums can be lifted clear from the ground by swinging the levers backwardly which causes the arms to lift the bolts and consequently the rear sides of the drum frames. This latter feature is important as it allows the machine to be readily handled and easily drawn when it is not cultivating.

What I claim as my invention is:—

In a cultivating machine, the combination with a frame, of shafts rotatably carried in bearings supported by the front of the main frame, arms permanently secured to the shafts and extending inwardly therefrom, levers pivotally secured to the frame, means for retaining the levers in any adjusted position, links connecting the levers with the arms, and drum frames pivotally secured to the inner ends of the arms and adjustably supported from the rear of the frame, as and for the purpose specified.

Signed at Winnipeg this 15th day of March 1912.

ALEXANDER McLEOD.

In the presence of—
G. S. ROXBURGH,
E. BELSHAM.